United States Patent [19]

Monfort

[11] Patent Number: 4,875,164

[45] Date of Patent: Oct. 17, 1989

[54] PROCESSING SYSTEM FOR A GAMBLING GAME

[76] Inventor: Jean-Jacques Monfort, 3 allée des Rives de Bagatelle, Suresnes 92150, France

[21] Appl. No.: 885,608

[22] PCT Filed: Oct. 23, 1985

[86] PCT No.: PCT/FR85/00301

§ 371 Date: Jun. 24, 1986

§ 102(e) Date: Jun. 24, 1986

[87] PCT Pub. No.: WO86/02752

PCT Pub. Date: May 9, 1986

[30] Foreign Application Priority Data

Oct. 25, 1984 [FR] France ................................ 84 16340

[51] Int. Cl.[4] ................................................ G06F 15/28

[52] U.S. Cl. ..................................... 364/412; 235/381; 273/274; 273/138 A

[58] Field of Search ................ 364/412, 410; 273/274, 273/138 A, 139; 235/381, 383

[56] References Cited

U.S. PATENT DOCUMENTS 4,108,361 8/1978 Krause ................................ 235/375
4,108,364 8/1978 Tanaka et al. ...................... 235/419
4,322,612 3/1982 Lange ................................. 235/419
4,339,798 7/1982 Hedges et al. ...................... 364/412
4,494,197 1/1985 Troy et al. .......................... 364/412
4,517,412 5/1985 Newkirk et al. ................. 179/7.1 R

FOREIGN PATENT DOCUMENTS 16491 12/1971 Australia .

*Primary Examiner*—Jerry Smith
*Assistant Examiner*—Steven G. Kibby
*Attorney, Agent, or Firm*—Wenderoth, Lind & Ponack

[57] ABSTRACT

A processing system for a gambling game includes a first self-contained and portable device enabling the reading, erasing and inscription on a data medium as well as the verification of the result of a drawing; a second fixed device associated with a computer of a betting management center enabling the reading of data written on the data medium by the first device, transmission to the management center for recording the read data of the bets, indication and optionally collection of sums of money to be collected as a stake and the inscription on the data medium in an area to which the first device has no access of indications relative to bet data. A drawing is defined to be the contents of a future event, the forecasting of which by a gambler allows him to win at least part of a stake.

20 Claims, 6 Drawing Sheets

SELECTION
GAME
ERROR
M A
A
B
GAME CONTROL
RESULT
RE-READ
MEMORY
ERASE
VALIDATION
3
6
9
2
5
8
1
4
7
C
0
CI

PROCESSING SYSTEM FOR A GAMBLING GAME

The invention relates to a processing system for gambling games.

In the present description and the appended claims, the following terms have the indicated meanings:

Game: the activity in the form of a contract which consists in the forecasting of a future event, whether this event be purely aleatory (for example a lottery) or non aleatory (for example forecasting the outcome of a sports event).

Gambler: the partner of the Gaming Firm in this contract.

Bet: the choice made by the gambler in the contract on the content of the future event.

Price: the sum to be paid by the gambler as stake or wager for this bet in the game, this price depending on, among other things, the game, the bet, the repetition of the bet, etc.

Drawing: the contents of the future event the forecasting of which by a gambler allows him to win at least a part of a stake.

Result: the partial or total coincidence between the bet and the content of the future event.

Winnings: that which is won by the gambler at the end of the contract, depending on the result.

Recording: the official taking into account of the bet of the gambler by the Gaming Firm.

At the present time, whether it concerns the composition of the bet by the gambler or its recording by the Gaming Firm, the operations are essentially manual and require considerable handling of receipts or other documents. Apart from the fact that these operations are fastidious, they are the source of many errors owing to human intervention which is exclusively manual. Further, for each bet, there exists a copy of the betting slip which must be sent to the premises of the Gaming Firm and which presents problems of transport, space and processing.

An object of the invention is to overcome these drawbacks by proposing a processing system for gambling games which permits the processing of the bets in a simple, rapid and reliable manner.

For this purpose, the system according to the invention is characterised in that it comprises the combination of information support including a memory zone which is capable of being erased and written into.

The system may advantageously include means for composing the drawing and for comparing the latter with the bet so as to provide the result, in particular by display means.

According to another characteristic, the system according to the invention is characterised in that, for the recording of the bet, it comprises: means for reading data carried by the bet support; fifth means for recording on the support already carrying the first data constituting the bet, second codification data representing the conditions of the recording of the bet, for example the place and the date; sixth means for storing the second data; seventh means for storing the bet data carried by the support; and eighth means for recording the first and second data on a recording support.

The system may comprise means for checking the exactness of the codification data carried by the bet support prior to any processing of bet data.

Pre-payment means may be provided which are adapted to actuate the bet recording means when the price of the bet has been paid.

The system may comprise means for checking that the recording has been correctly effected; it may also include means for delivering a voucher, for example a receipt, this voucher being independent of the bet support; advantageously, the means for checking the recording actuates the means delivering the voucher.

Means for checking unitary data constituting the bet may be provided for ascertaining that this data belong to a library. Similar checking means may also be provided for ensuring that all of the data constituting the bet is correct.

Advantageously, means may be provided for partially or totally erasing the data constituting the bet before the latter has been recorded.

The system may also include manual control and processing means for ascribing to the bet parameters outside its content (subscription, repetition of the same bet, etc.) and memory means for storing said parameters.

The system comprises advantageously means for reading and displaying the data constituting the bet carried by the bet support.

It may also include means for controlling and checking the position of the bet support.

For the purpose of indicating to the player the price to be paid for the bet and possibly for the payment of this price, the system comprises means for calculating said price.

Advantageously, in order that it be adaptable to various games, the system comprises programming means for the selection on the part of the player of a particular game among a plurality of games.

The invention will be well understood from the following description with reference to the accompanying drawings, in which.

Figures 1, 1A:
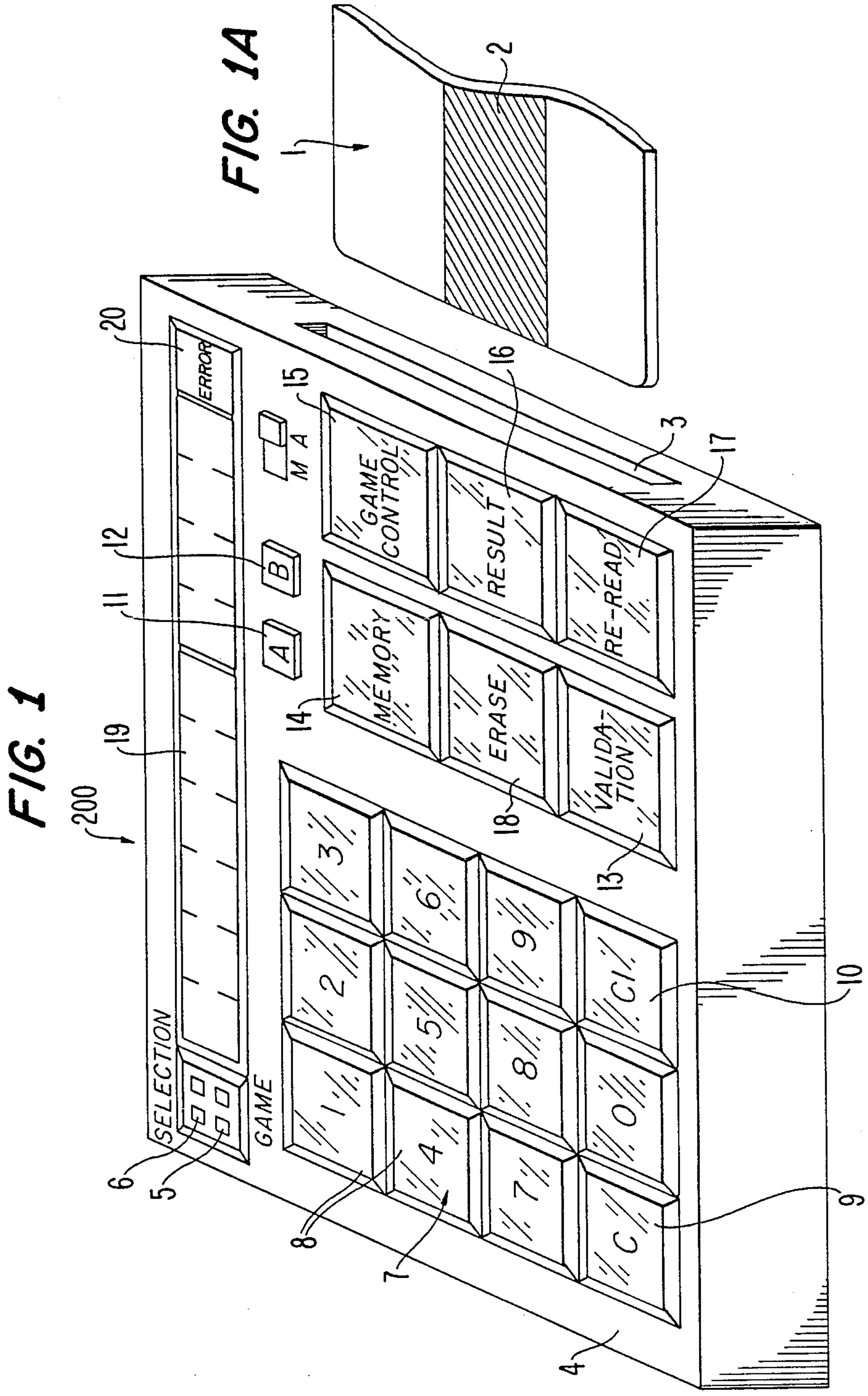
FIG. 1 is a perspective view of a system according to the invention in the form of an individual apparatus enabling the player to compose the bet.
Figure 2:
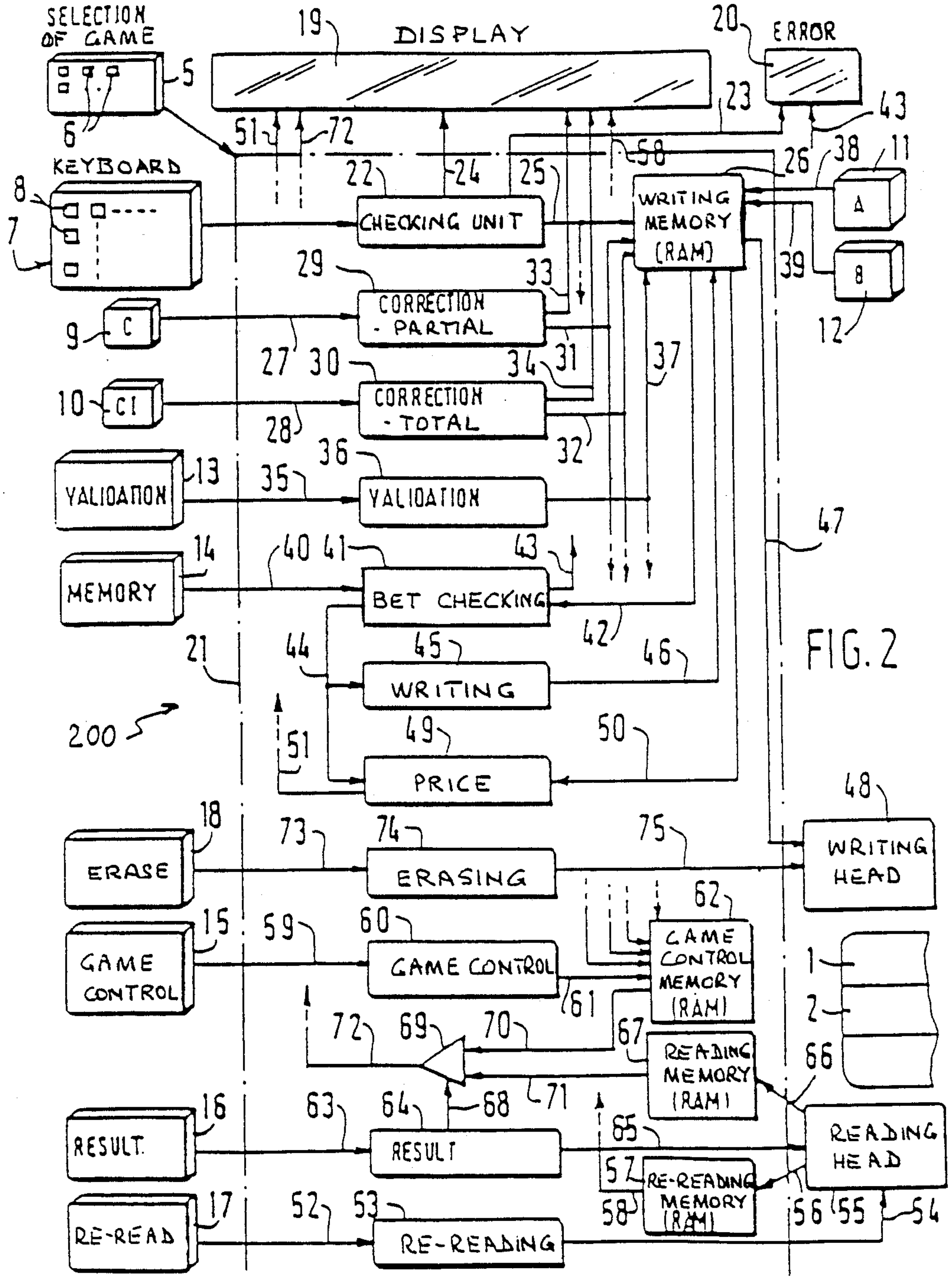
FIG. 2 is a block diagram of the system of FIG. 1.

The embodiment shown in FIGS. 1 and 2 will first of all be described.

In this embodiment, the system according to the invention comprises an individual independent apparatus 200 of small size possessed by the player by buying or renting this apparatus. This apparatus is adapted to cooperate with a bet support 1, preferably constituted by a card, for example a semi-conductor memory or magnetic card. By way of example, there has been shown a magnetic card having a magnetic track 2 as a support or medium for the data.

The card 2 is adapted to be received in a cavity 3 provided in the body of the apparatus.

The upper side 4 of the apparatus 200 carries various means for controlling and displaying the functions. A selecting keyboard 5 enables the player to select the game in which he desires to make the bet, by means of keys 6 of this keyboard. A keyboard 7 having keys 8, for example numerical keys, enables the player to compose his bet. Keys 9 and 10 of the keyboard 7 enable the player to partially or completely erase, in particular in the case of an error, the content of the bet before the validation of the latter on the card 1. Keys 11 and 12 enable the player or gambler to add to his bet parameters exterior to the content proper of the bet, for example for a subscription or a repetition of the same bet. A validation key 13 enables the storage, before storing in memory, if the content of the bet is correct. A memory 14 enables the transfer of the content of the bet to the card 1. A game control key 15 permits putting the apparatus into a condition for displaying the drawing. A result key 16 enables the gambler to know whether he has won, by comparison between the drawing and his bet which determines the level of the winnings. A key 17 enables the gambler to re-read the content of the bet transferred to the card 1. An erasing key 18 enables the gambler to completely erase the card 1. A display 19 displays to the gambler the content of the bet in the course of recording, the price to pay and the result. An error selecting display 20 signals to the gambler anomalies due to the apparatus or to his own manipulations.

The structure and the operation of the apparatus shown in FIG. 1 will be described with reference to FIG. 2.

In the known way, the active elements of the system shown in FIG. 2 are based on integrated circuits and they are constituted by a programmable microprocessor 21. The selection of the programming of the microprocessor 21 is ensured by the keys 6 of the gambling game selecting keyboard 5 which puts the apparatus in the condition for the game chosen by the gambler. By means of the keys 8 of the keyboard 7, the gambler selects in succession the "words" constituting the content of the bet. The keyboard 7 controls a control or checking unit 22 which ascertains whether each of the unitary words belongs to a library of data particular to the selected game. If the word does not belong to the library, the unit 22 sends at 23 an error signal to the error display 20. On the other hand, if the word does belong to the library, it is displayed at 24 on the display 19 and, at the same time, it is stored at 25 in a random access memory (RAM memory) 26. During the writing, if the gambler makes a mistake o desires to modify the writing, he actuates at 27, 28 a partial or total correction circuit 29, 30; this correction circuit 29, 30 erases at 31, 32 the corresponding part of the memory 26 and, at the same time, erases at 33, 34 the corresponding optical indications existing in the display 19. After having written a "word", the gambler presses the validation key 13 which actuates at 35 a validation circuit 36. This validation circuit 36 actuates at 37 a memory 26 for indicating the end of a word (word separator). The operator proceeds in this way until the complete content of his bet is transmitted to the memory 26. Before or after the composition of the bet, the gambler may press at least one of the keys 11, 12 for actuating at 38, 39 the memory 26 so as to write therein parameters associated with the content of the bet; these parameters may, for example, relate to a subscription, to a repetition of the same bet, or the like.

After having composed his bet and added thereto the above parameters, the gambler presses the memory key 14 which actuates at 40 a bet checking circuit 41. The circuit 41 reads at 42 the content of the memory 26; if this content is erroneous, for example if the gambler has not composed enough "words", it transmits at 43 an error signal to the error display 20; on the other hand, if this content is correct, the checking circuit 41 actuates at 44 a writing command circuit 45. The circuit 45 actuates at 46 the memory 26 so that the complete content of the bet is transferred at 47 in a non-destructive manner to a head 48 for writing the data on the magnetic track 2 of the card 1. At the same time, the checking circuit 41 actuates at 44 a circuit 49 for showing the price to be paid by the gambler for his bet. The circuit 49 interrogates at 50 the memory and calculates in a way known per se, which is not part of the present invention, the price corresponding to the bet. The information of this price is transmitted at 51 to the display 19.

After the storage or writing of his bet on the card 1, the gambler can make sure of the exactness of the writing by pressing the re-reading key 17 which actuates at 52 a re-reading command key 53. The circuit 53 actuates at 54 a reading head 55 which reads the bet data carried by the magnetic track 2 and transmits them at 56 to a reread memory 57 which actuates at 58 the display 19 for displaying to the gambler the data of the bet carried by the card 1.

After the draw, if the gambler wishes to check whether he has won, he first of all presses the game control key 15. This key actuates at 59 a game control circuit 16 which actuates at 61 a game control random access memory (RAM) 62. He then inputs into the memory 62 the content of the drawing by means of the key 7, the correction keys 9, 10 and the validation key 13. When the content of the drawing has been introduced in the memory 62, the gambler presses the result key 16 which activates at 63 a result command circuit 64. The circuit 64 actuates at 65 the reading head 55 which reads the bet data carried by the card 1 and transfers it at 66 to a bet reading memory (RAM) 67. At the same time, the result command circuit 64 actuates at 68 a comparator 69 whose two inputs 70,71 are interrogation lines for the memories 62 and 67 which contain the drawing and the bet respectively. The comparator 69 compares these two data units and transmits at 72 the result to the display 19 so as to indicate to the gambler visually whether he has won and the level of the winnings.

In order to completely erase the magnetic track 2 of the card 1, the gambler can press the erasing key 18 which actuates at 73 an erasing circuit 74. The erasing circuit 74 actuates at 75 the reading head 48 which completely erases the data which may be present on the track 2.

Figure 3:
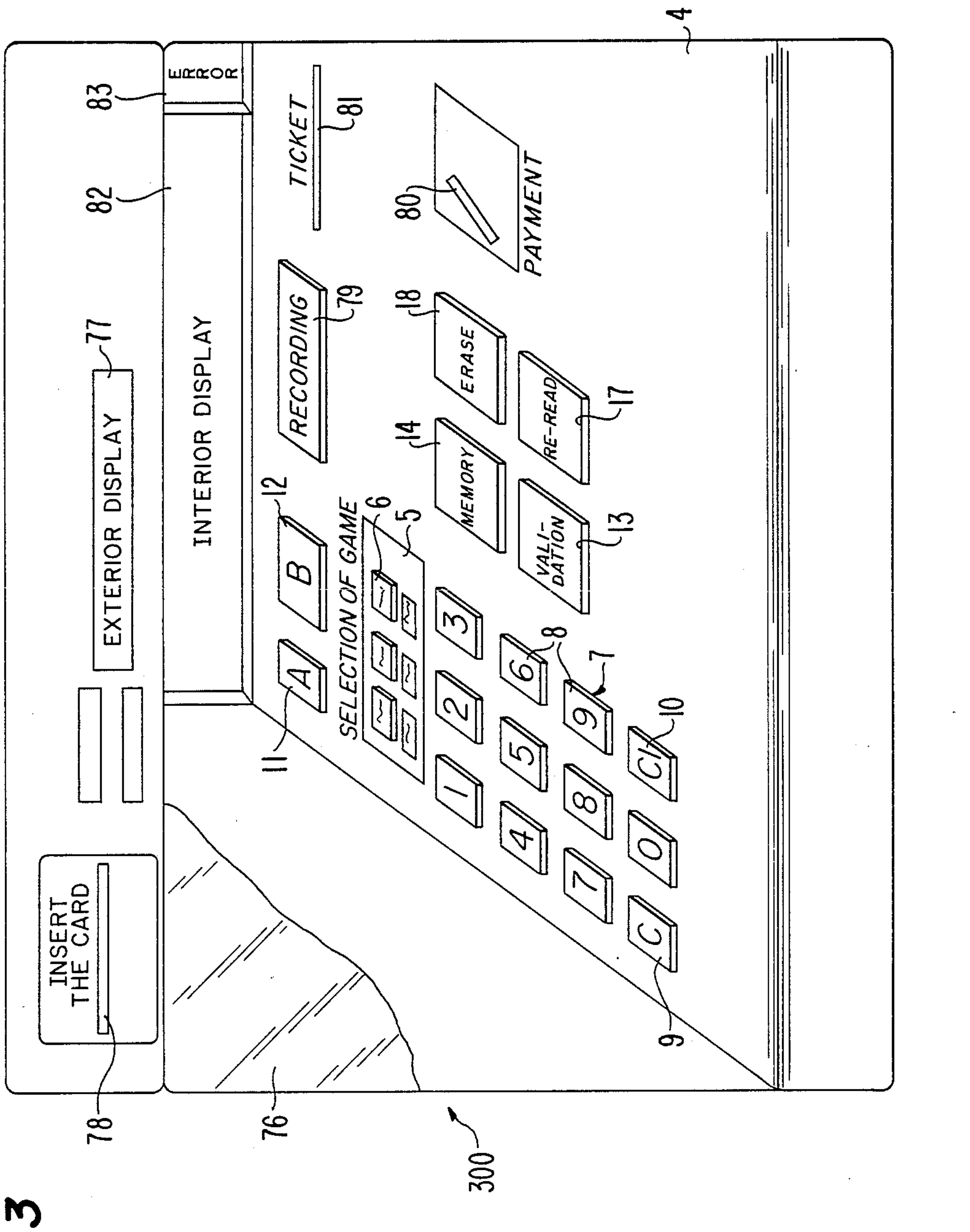
FIG. 3 is a perspective view of a system in accordance with another embodiment, in the form of an automatic desk permitting the composition and the recording of the bets by the public.
Figure 4:
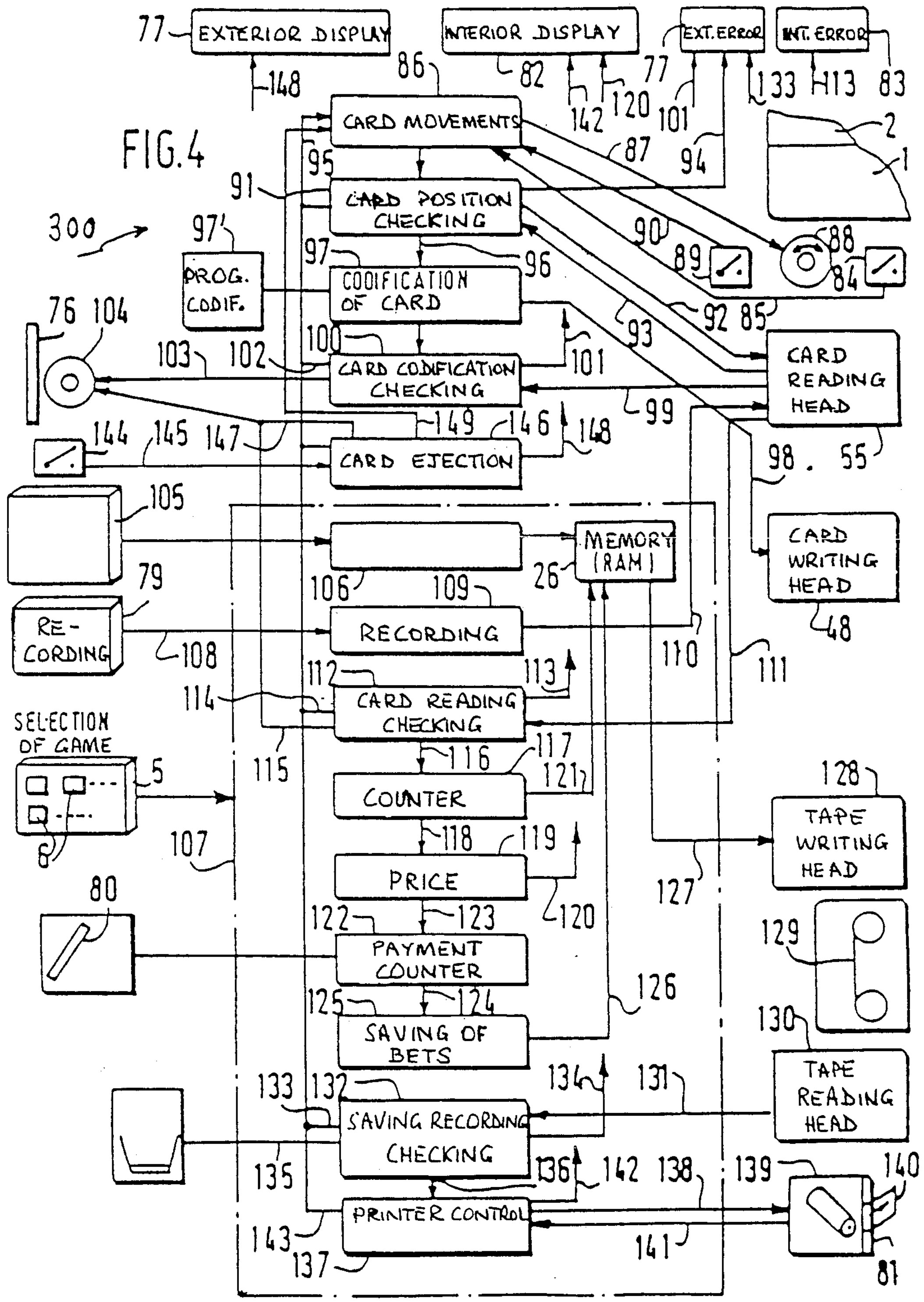
FIG. 4 is a block diagram of the system of FIG. 3.

While the system shown in FIGS. 1 and 2 is an individual apparatus which only permits, in the procedure of the game, the composition of the bet, the system 300 shown in FIGS. 3 and 4, on one hand, is accessible to the public, and, on the other hand, also permits the recording of the bets.

In the following description of the system 300 of FIGS. 3 and 4, the same references as in FIGS. 1 and 2 will be adopted for identical or like elements.

As shown in FIG. 3, the apparatus is in the form of a desk which is normally closed by a door 76. When it is closed, the door 76 however allows to be seen an exterior display 77 and a slot 78 for the introduction of the card 1 (FIG. 2). When it is opened, the door 76 lays bare a panel 4 which carries, as the panel 4 of FIG. 1, the control and display elements accessible to the gambler. The panel 4 carries a keyboard 5 having keys 6 for the selection of the game, a keyboard 7 having keys 8, for example numerical keys, for the composition of the bet, correcting keys 9, 10, keys 11, 12 for associating with the bet additional parameters, a key 13 for the validation of the composition of the bet, a key 14 for the storage in memory of the bet on the card of the gambler, a key 17 for re-reading the bet stored on the card, a key 18 for erasing the card, a key 79 for recording the bet, a payment slot 80, a slot 18 for delivering a payment and recording voucher, an interior display 82, and an interior error display 83.

In a manner similar to FIG. 2, FIG. 4 is a block diagram showing the structure and the operation of the apparatus of FIG. 3.

When the gambler inserts his card 1 in the slot 78, he actuates a switch 84 which actuates at 85 a circuit 86 commanding the movements of the card. The circuit 86 actuates at 87 a motor 88 which, in this case, introduces the card into the apparatus. When the card is at the end of the introduction travel, it actuates a contact 89 which actuates at 90 the circuit 86 which causes the stoppage of the motor 84. At the same time, the circuit 86 actuates a card position checking circuit 91. The circuit 91 actuates at 92 the card reading head 65 which reads on the card the correct position data and transfers them at 63 to the checking circuit 91. If the reading is not correct, the checking circuit 91 transmits at 94 an error signal to the exterior error display 77 and, at the same time, it actuates at 95 the circuit 86 for the ejection of the card 1 from the apparatus by the motor 88. On the other hand, if the reading is correct, the checking circuit 91 actuates at 96 a card codification circuit 97. The function of the circuit 97 is to put onto the card 1 data concerning the identification of the desk and the date. The circuit 97 receives its codification data information from a programming circuit 97'. When it is actuated by the checking circuit 91, the codification circuit 97 transfers at 98 the codification data to the head 48 for writing on the card in a zone which is inaccessible to the device 200 of the FIGS. 1 and 2.

When it is transferred to the card 1, the identification data is read by the reading head 55 and transferred at 99 to a circuit 100 for checking the codification of the card. The circuit 100 compares the codification data stored therein and the codification data read by the reading head 55. If there is no coincidence between these two data groups, the checking circuit 100 transmits a signal 101 to the exterior error display 77; at the same time, it actuates at 102 the circuit 86 for the ejection of the card by the motor 88. On the other hand, if there is a coincidence, the checking circuit 100 actuates at 103 the motor 104 for shifting the door 76 so as to open the latter.

The gambler can then proceed, if this has not already been done, to the composition of his bet by means of the game selector 5 of the bet composition keyboard 7, the error keys 9, 10, parameter keys 11, 12, the validation keys 13, the storage key 14, and the re-reading key 17; he is also able at any moment to erase the card by means of the erasing key 18. These keys and their associated circuits are identical to those of the embodiment of FIGS. 1 and 2; for this reason, their description will not be repeated and, for the purpose of rendering FIG. 4 more clear, the keys are symbolically represented by a single key 105 and these associated circuits are symbolically represented by the circuit 106. It is consequently understood that the symbolical key 105 performs the functions of keys 8–14 and 17 of FIG. 2, and that the symbolical circuit 106 ensures the functions of the circuits 22, 29, 30, 36, 41, 53 and 74, the re-reading memory 57 not being shown but the memory 26 being shown in FIG. 4, since it cooperates with other elements of the latter. For the description of the composition of a bet, the re-reading and the erasing, reference may be had to that given before in respect of the apparatus of FIGS. 1 and 2.

The symbolic circuit 106 is part of a microprocessor 107 which is programmed and selected by the game selector 5.

When the gambler has composed his bet and has stored it on the card 1, he can then proceed to its recording.

Figure 5:
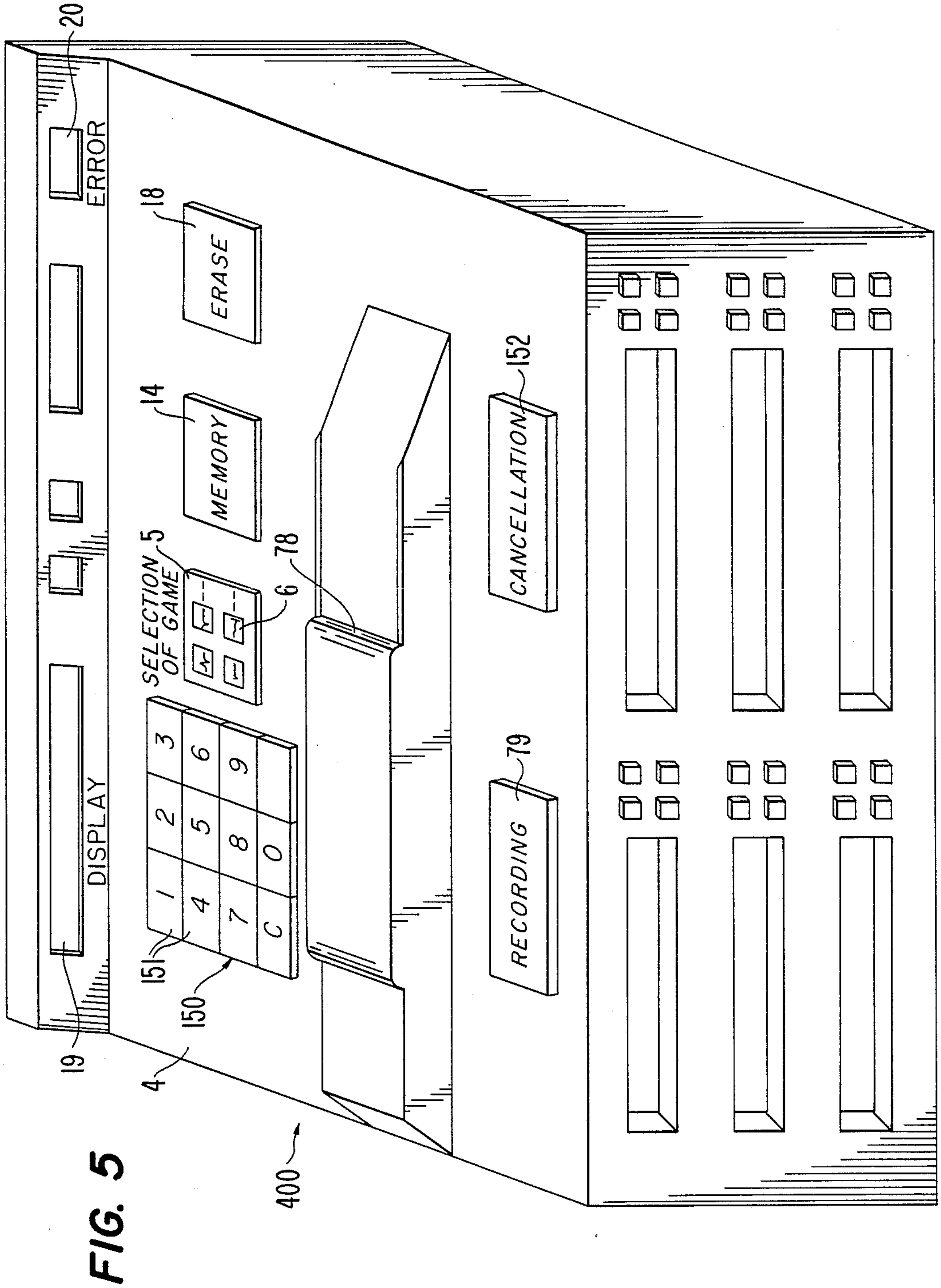
FIG. 5 is a perspective view of a system according to a third embodiment of the invention, in the form of an apparatus for recording bets located on the premises of the Gaming Firm or of an official Agent of the latter.

These operations can be carried out, either with the part of the apparatus of FIG. 3 already described, or with the apparatus of FIG. 5. In the latter case, the gambler introduces his card already coded for the bet in the exterior slot 78, which causes, as described before, the opening of the door 76 if the required conditions are satisfied. These conditions are independent of the fact that the card 1 carries or does not carry bet data. In the second case, the door 76 is already open, and the gambler proceeds to the recording of his bet.

For this purpose, he presses the recording key 79 which actuates at 108 a recording command circuit 109. This circuit 109 activates at 110 the reading head 55 for the card, the reading concerning the content of the bet and the codification data. The data of the card which are thus read are transferred at 111 to a card reading checking circuit 112. The circuit 112 checks the content of the data and, if the reading is incomplete or incorrect, it transmits at 113 an error signal to the interior display 83 so as to invite the gambler to repeat the recording. After three attempts, if the reading is still incomplete or incorrect, the circuit 112 actuates at 114 the circuit 86 which excites the motor 88 for the ejection of the card. In this case, the checking circuit 112 actuates, at 115, the motor 104 of the door 76 so as to close the latter. On the other hand, if the reading is correct, the checking circuit 112 activates at 116 a counting circuit 117 by transferring thereto the data of the bet. The circuit 117 analyzes the bet and actuates at 118 a circuit 119 for calculating the price. The circuit 119 transmits at 120 to interior display 82 a signal optically indicating to the gambler the price to pay for the bet. If this has not already been done, the complete information relating to a bet, which is located in the counter 117, is transferred at 121 to the memory 26.

The gambler then introduces into the slot 80 coins of money; a counter 122 totalizes the sum thus introduced and compares it with the price calculated by the circuit 119, the indication of this price being transferred thereto at 123. When the price to be paid has been reached, with or without return of change, the counter 122 actuates at 124 a bet saving circuit 125 which actuates at 126 the memory 26 so as to transfer at 127 the content thereof to a head 128 for writing on a magnetic recording tape 129. For safety purposes, the tape 129 and its writing head 128 may be doubled. At the end of the writing, the information transferred to the tape 129 is read by a tape reading head 130 which is transferred at 131 to a circuit 132 checking the saving recording. If the recording is erroneous, the checking circuit 132 commands, at 133, the circuit 86 for the ejection of the card by the motor 88, the exterior display at 134 of an out of order signal, and at 135 the re-imbursement of the gambler as the latter has paid without the recording of his bet. On the other hand, if the information is correct, the checking circuit 132 activates at 136 a printer control circuit 137. The circuit 137 actuates at 138 a printer 139 which delivers to the gambler, through the slot 81, a recording voucher 140, for example a receipt, on which appear the content of the bet, the price paid, its card number and the codification data. At the end of the printing, the printer 139 actuates at 141 the circuit 137 to indicate thereto that the printing has finished. The circuit 137 then transmits at 142 a signal to the interior display 82 so as to indicate to the gambler to take his ticket. At the same time, the circuit 137 actuates at 143 the circuit 86 for exciting the motor 88 for the ejection of the card.

When the card is ejected by the motor 88, it extends beyond the slot 78 (FIG. 3) and actuates an exit switch 144. This contact actuates at 145 a card ejecting unit 146 which excites at 147 the motor 104 for closing the door 76. At the same time, the ejection circuit 146 transmits at 148 a signal for displaying on the exterior display 76 a signal requesting the gambler to take back his card. The ejection circuit 146 is so arranged that, if the card has not been withdrawn within a prescribed delay from the moment when the closure of the door 76 was commanded, for example 30 seconds, it actuates at 149 the circuit 86 which operates the motor 88 in the direction for introducing the card, without taking into account the presence of the switch 89 relating to the end of the introduction of the card. The card drops into a receptacle (not shown) for its subsequent recovery by the Gaming Firm.

Figure 6:
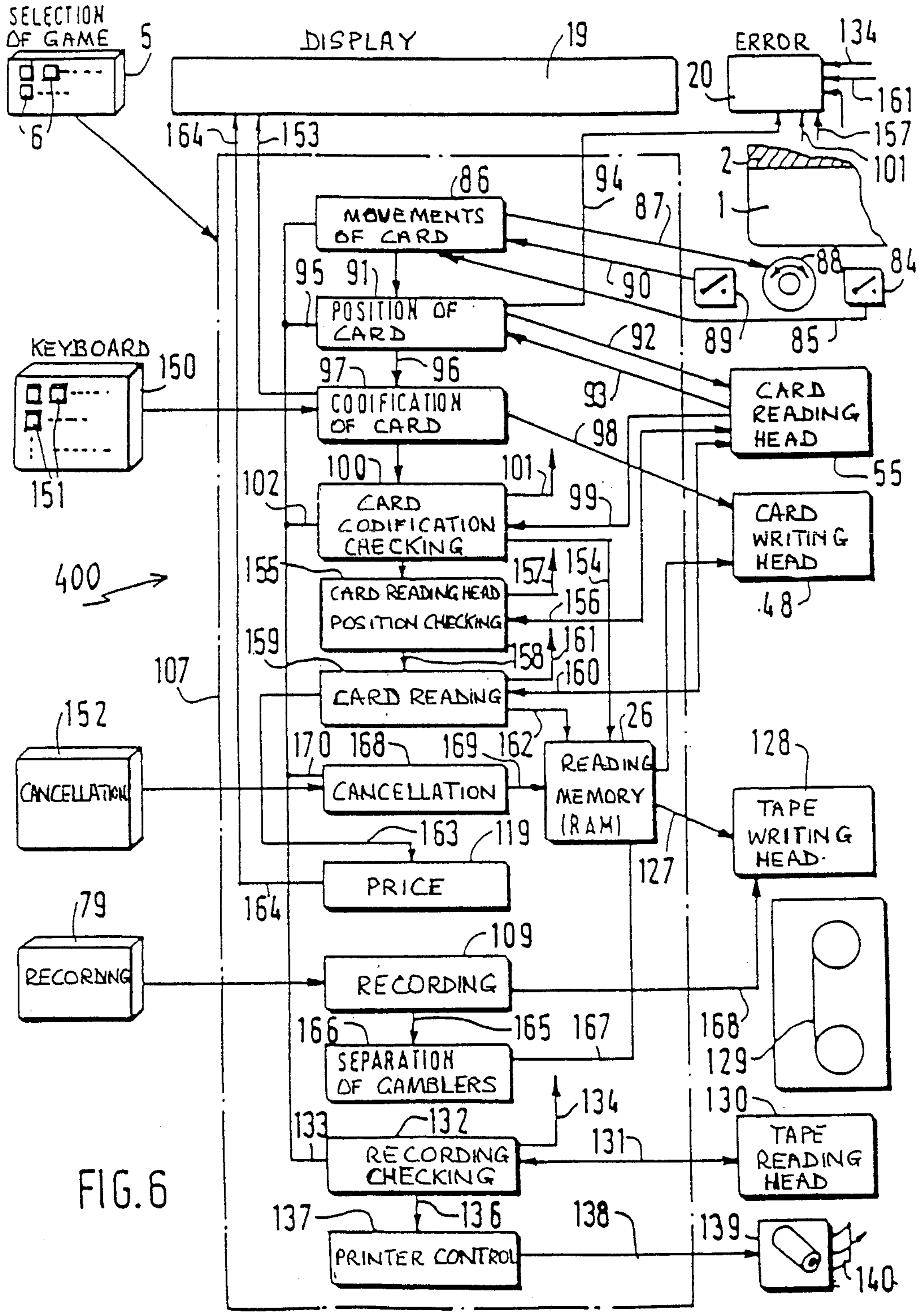
FIG. 6 is a block diagram of the system shown in FIG. 5.

FIGS. 5 and 6 show a third embodiment of the invention. This embodiment relates to an apparatus 400 which is exclusively intended for the recording of the bets from a card 1 already bearing the data constituting the bet, this data having been transferred onto the card, for example by the apparatus of FIGS. 1 and 2, or by that of FIGS. 2 and 3.

In the description of the embodiment of FIGS. 5 and 6, the same reference characters as in FIGS. 1 to 4 will be adopted for identical or like elements.

The apparatus shown in FIG. 5 is adapted to be placed on the premises of the Gaming Firm or, of a Receiver of Taxes, or other Official for recording bets.

It has an upper panel 4 carrying the control and information elements accessible to the gambler: a keyboard 150 having keys 151 for the establishment of the card codification data, this codification representing the conditions of recording, a memory key 14, an erasing key 18, a data display 19, an error display 20, a recording key 79, a cancelling key 152, and a card introducting slot 78.

FIG. 6 is a block diagram showing the structure and the operation of the apparatus of FIG. 5.

When the card 1 is introduced into the slot 78, it actuates an entrance switch 84 which actuates a circuit 86 for the movements of the card. The circuit 86 actuates at 87 the motor 88 for shifting the card and rotating, in this case, in the direction in which the card 1 is introduced into the apparatus. At the end of the introduction travel, the card 1 actuates a switch 89 which actuates at 90 the circuit 86 for stopping the motor 88. When the circuit 86 is actuated by the switch 89, it activates a circuit 91 for checking the position of the card at the end of the introduction travel. The checking circuit 91 actuates at 92 a head 55 for reading the magnetic track 2 of the card 1, this reading concerning data checking the positioning of the card. The result of the reading is sent at 93 to the checking circuit 91 which effects a comparison with set data. If the reading is not correct, the circuit 91 transmits at 94 an error signal to the display 20; at the same time, it actuates at 95 the circuit 96 for the ejection of the card 1 by the motor 88. On the other hand, if the information is correct, the circuit 91 actuates at 96 a circuit 97 for the codification of the card. The circuit 97 is adapted to transfer onto the card 1 data representing the conditions of recording (place, date, etc.). This codification data may either be programmed, as in the embodiment of FIG. 4, or be composed by the operator with the aid of keys 151 of the keyboard 150. The codification data is entered into the codification circuit 97 and it is transferred therefrom at 98 to a head 48 for writing onto the magnetic card 1 in a zone which is not accessible to the device 200 of FIGS. 1 and 2.

After its writing, the codification data on the card 1 is read by the reading head 55 and transferred at 99 to a circuit 100 for checking the codification of the card. The circuit 100 effects a comparison between the data read by the head 55 and the codification data it receives from the codification circuit 97. If the read information is not correct, the circuit 100 transmits at 101 an error signal to the display 20; at the same time, it actuates at 102 the circuit 86 which operates the motor 88 in the direction for ejecting the card. On the other hand, if the information is correct, the codification data contained in the circuit 100 passes at 154 into the reading memory (RAM) 26. At the same time, the checking circuit 100 actuates a circuit 155 for checking the position of the card reading head. The circuit 155 actuates at 156 the reading head 55 so that the latter reads on the card data checking the correct positioning. If the reading is not correct, the circuit 155 transmits at 157 an error signal to the display 20. On the other hand, if the reading is correct, the checking circuit 155 actuates at 158 a circuit 159 commanding the reading. The circuit 159 commands at 160 the reading of the bet data borne by the card 1 by the reading head 55. The circuit 159 analyzes the bet data. If the reading is erroneous, the circuit 159 transmits at 161 an error signal to the display 20. On the other hand, if the reading is correct, the bet data which is read is transferred at 162 into the memory 26. At the same time, the circuit 159 actuates at 163 a price calculating circuit 119 by transferring thereto the necessary accountancy data. The circuit 119 transmits at 164 a signal indicating the price to the display 19 so as to indicate the price to pay to the gambler.

When the gambler has paid the price of the bet, the operator presses the recording key 79 which activates a circuit 109 for the recording of the bet. The circuit 109 actuates at 165 a circuit 166 for separating gamblers. The coded information of this circuit 166 is sent at 167 to the memory 26 which already contains the other data relating to the bet, to the gambler, and to the conditions of recording. The recording circuit 109 actuates at 168 a head 128 for recording on a tape 129 the data received at 127 from the memory 26. For safety reasons, the tape 129, its writing head 128 and its reading head 130 are doubled. At the end of the stage of the writing on the tape 129, the reading head 130 for the tape is activated so as to read the tape and transfer at 131 the read data to a circuit 132 checking the recording. If the reading is erroneous or indicates a partial recording, the circuit 132 transmits at 134 a recording error signal to the display 20; at the same time, it actuates at 133 the circuit 86 so as to cause the ejection of the card by the motor 88. On the other hand, if the reading is correct, the checking circuit 132 actuates at 136 a circuit 137 which brings into operation at 138 a printer 139. The printer is adapted to deliver to the gambler a voucher 140 of the receipt type bearing all the useful indications concerning the bet and its recording.

If, in the course of utilization of the apparatus, the operator desires to cancel that which has been done, he presses the cancelling key 152 which activates a cancelling circuit 168. The cancelling circuit 168 erases at 169 the content of the memory 26 and actuates at 170 the circuit 86 for the ejection of the card by the motor 88.

The tapes 129 (FIGS. 4 and 6) are read in the processing centres of the Gaming Firm by a suitable system.

The result of this reading is sent to a computer which carries out the management of the bets by means of specific programs.

It is clear from the foregoing that, with the system according to the invention, the gambler may compose and record his bet in a simple and reliable manner. Further, the handling of bet slips on the part of the gambler and the Gaming Firm is avoided.

In order to accelerate and facilitate the processing of the bets, the systems of FIGS. 3 to 6 which ensure the recording of the bets, may be connected to a central unit through a connection of the Modem (modulator-demodulator type).

As a modification, the terminal itself may be equipped with a magnetic card or memory card reading device.

I claim:

1. A system for processing a gambling game having determined paying and stake rules, said game consisting of receiving and recording bets of gamblers, collecting sums paid by the gamblers with respect to a stake, carrying out a drawing in accordance with the rules of the game and distributing winnings to those gamblers whose bets correspond to the drawing, said system comprising:

an information support comprising a memory zone capable of being erased and written into;

a first means, said first means being independent and portable and comprising a first reading means, an erasing means, and a first writing means for respectively reading, erasing and writing bet data in said information support, and a checking means for checking of the result after the drawing;

a second means associated with a computer of a bets managing center, said second means comprising a second reading means for reading bet data written in said information support by said first means, and a sending means for sending to said computer of said bets managing center bet data to be recorded, and an indicating and recording means for indicating and collecting sums to be collected with respect to the stake, and a second writing means for writing in said information support in a zone inaccessible to said first means indications relating to the bet data.

2. A system according to claim 1, wherein said first means further comprises a means for checking whether the whole of the data constituting said bet satisfies predetermined conditions.

3. A system according to claim 1, wherein said first means further comprises a keyboard having keys and a display means.

4. A system according to claim 1, wherein said first means further comprises a manually controlled processing key means for assigning to the bet parameters which are unrelated to its content, and a memory means for storing said parameters.

5. A system according to claim 1, wherein said first reading means comprises a means for reading and displaying data constituting the bet carried by said information support.

6. A system according to claim 1, wherein said first and second means further comprise a means for calculating the price of said bet and a means for indicating this price to the gambler.

7. A system according to claim 1, wherein said first means further comprises a programming means for the selection by the gambler of a particular game from a plurality of games.

8. A system for processing a gambling game according to claim 1, wherein said information support comprises a card having a magnetic track.

9. A system for processing a gambling game according to claim 1, wherein said information support comprises a semiconductor memory card.

10. A system for processing a gambling game according to claim 1, wherein said first means further comprises a manually controlled means for composing successively data constituting a bet; a memory means for sequentially storing said data constituting a bet; and a manually controlled means for actuating said first writing means.

11. A system according to claim 10, wherein said first means further comprises a means for checking whether data of each unitary word of the bet composed by said gambler belongs to a library of data particular to said game.

12. A system according to claim 10, wherein, in the case of a mistake made by the gambler or in the case of a writing modification desired by the gambler, said first means further comprises a means for partially or totally erasing from said memory means the data constituting the bet before the recording thereof in said information support.

13. A system according to claim 10, wherein said first means further comprises a means for entering the results of the drawing when known, and wherein said checking means compares the latter with said bet so as to provide the result.

14. A processing system according to one of said claims 1 to 13, wherein said bet data comprises first data, said first data being data constituting said bet, and second codification data representing the conditions of the recording of said bet.

15. A system according to claim 14, wherein said sending means comprises a means for checking said second codification data prior to sending said bet data to said computer for recording.

16. A system according to claim 15, wherein said second means further comprises a pre-payment means adapted to actuate said sending means for recording of said bet when the price of said bet is paid.

17. A system according to claim 16, wherein said prepayment means comprises a means for controlling a recording of savings.

18. A system according to claim 17, wherein said prepayment means further comprises a means for delivering a voucher of the recording, said voucher being independent of said information support.

19. A system according to claim 18, wherein said prepayment means further comprises a control means adapted to initiate said means for delivering the voucher.

20. A system according to claim 14, further comprising a means for checking the position of said information support relative to said data recording means.

* * * * *